United States Patent Office 3,728,124
Patented Apr. 17, 1973

3,728,124
COLORATION OF POLYESTER FILM MATERIALS
James Lyon Whyte, Welwyn Garden City, England, assignor to Imperial Chemical Industries Limited, London, England
No Drawing. Filed Dec. 2, 1970, Ser. No. 94,564
Claims priority, application Great Britain, Dec. 5, 1969, 59,512/69
Int. Cl. G03c 1/84
U.S. Cl. 96—84 R          10 Claims

ABSTRACT OF THE DISCLOSURE

Grey dyed polyester photographic film support dyed with at least two dye components selected from 6-paratoluidino-3-methyl 1′9′ anthrapiridone, indanthrone, tetrachloro phthalo perinone and 1,4-bis(4-n-butyl-anilino)-5,8-dihydroxy anthraquinone.

---

The present invention relates to the colouration of polymeric materials, and in particular to such coloured polymeric materials suitable for the production of films. The invention is more particularly concerned with coloured film suitable for use as a photographic film base.

Film supports for cine or recording films should generally be resistant to halation and light piping effects. This can be achieved by tinting the film with a grey dye. The dyes chosen for this purpose should be heat stable at the temperatures to which the polymeric material is subjected after the dye has been incorporated.

According to the present invention there is provided a coloured organic polymeric material containing a grey dye, said dye comprising at least two components selected from 6-paratoluidino-3-methyl 1′ 9′ anthrapiridone, indanthrone, tetrachloro phthalo perinone and 1,4-bis(4-n-butyl-anilino)-5,8-dihydroxy anthraquinone.

We find that useful grey dyes for forming photographic film supports are obtained when one of the dye components is indanthrone.

In another aspect of the invention a useful photographic film support is coloured with a dye comprising 6-paratoluidino-3-methyl 1′ 9′ anthrapiridone and 1,4-bis(4-n-butyl-anilinone)-5,8-dihydroxy anthraquinone.

Generally the grey dye may contain two or three of the dye components mentioned hereinabove. Each of the dye components employed in colouring the polymeric material may be present in an amount in the range 0.005 to 0.15% by weight of the polymeric material. When light piping and halation effects must be reduced, e.g. in cine film, higher amounts of the dye components may be employed, e.g. up to 0.15%. When light piping only must be reduced, e.g. in recording film, lower concentrations of the dye components may be employed, e.g. up to 0.05%.

Generally the components of the dye may be used collectively in an amount in the range 0.03 to 0.15% by weight of the polymeric material, although some dyes may be employed in slightly higher collective proportions.

The polymeric materials and photographic film supports which may be coloured according to the invention include materials such as cellulose esters and cellulose mixed esters or thermoplastics materials such as polyamides, polycarbonates, polymers and copolymers of propylene, and polyesters such as polyethylene terephthalate. We particularly prefer to make photographic film supports from polyethylene terephthalate and find that the dyes employed according to the invention are suitable for colouring such supports since they are stable at the temperatures normally employed in manufacturing the polymeric material and in producing films therefrom.

The dye may be incorporated into the polymeric material, particularly polyesters such as polyethylene terephthalate, by blending in a known manner with the powdered or granulated polyester. Alternatively the dye may be incorporated into the polymeric material during its manufacture. This procedure may be adopted for colouring polyesters such as polyethylene terephthalate by adding the dye components to the polycondensation reaction since the dyes are stable at the temperatures employed for such reactions.

When a polyester film support is employed for photographic uses it should be biaxially oriented and heat set. This may, for example, be accomplished in an apparatus constructed to stretch continuous lengths of film in the machine and transverse directions. In such apparatus a flat film is extruded on to a rotating drum on which it is quenched and is then oriented in the machine direction by being drawn between two sets of nip or capstan rollers, the second set rotating at a speed greater than the speed of rotation of the first set by an amount equal to the required draw ratio. The slow rollers may be heated to the desired drawing temperature or alternatively the film may be heated between the fast and slow rollers by radiant heat. The film may then be drawn in the transverse direction in a stenter apparatus conveniently located in a heated oven. The biaxially oriented film may then be heat set and if desired dimensionally stabilised in a known manner.

The film supports produced according to the present invention may be coated with photographic emulsion layers such as light sensitive silver halide coatings. Since polyester film supports are highly hydrophobic and the silver halide emulsion layers are highly hydrophilic the film support is normally treated in order to enhance the adhesion to the emulsion layer. The treatment which is commonly employed involves applying an anchoring layer, usually termed a subbing layer, to the film support and then applying the emulsion layer over the subbing layer. The subbing layer may, for example, be applied as an aqueous composition of a vinylidene chloride polymer or copolymer, for example, the terpolymer of vinylidene chloride, methyl acrylate and itaconic acid.

In order that the invention may be more readily understood it is further illustrated in the following non-limiting examples, in which parts are measured by weight.

EXAMPLE 1

75 parts of bis($\beta$-hydroxy ethyl) terephthalate, prepared in a known manner, were melted under oxygen-free nitrogen in a heated stainless steel vessel having a vacuum take off condenser and stirrer. 0.04 parts of antimony trioxide catalyst and a grey dye comprising by weight 0.0211 part indanthrone and 0.0255 part tetrachlorophthalo perinone were added. The mass was agitated and the temperature raised as rapidly as possible. Ethylene glycol distilled along the vacuum take off and was condensed and collected. When the temperature had reached 245° C. the vacuum pump was started to reduce the pressure at a rate which gave a reduced pressure of 1 mm. as the various stages described in this example and was not continued at 278° C. and a pressure of less than 1 mm. for 2.3 hours. The molten polymer was extruded through a bottom outlet in the vessel by nitrogen pressure applied above its surface.

Film was produced from the polymer in a conventional manner by extrusion on to a quenching roll followed by longitudinal orientation by stretching between a set of slow rollers and a set of fast rollers, transverse orientation by stretching in a stenter oven and finally heat setting in a stenter oven. The film was stretched to 3.5 times its original length in the longitudinal and transverse directions.

A subbing layer comprising an aqueous latex of 92% vinylidene chloride, 6% methyl acrylate and 2% itaconic acid was applied to the film after it had been heat set. A gelatin subbing layer followed by a sensitive silver halide emulsion layer were then applied to the film in a conventional manner.

The film was subjected to the normal processing solutions employed in processing photographic materials.

The grey colour of the film was observed throughout the various stages described in this Example and was not affected by the conditions employed in the production of the polymer, its formation into a film and its treatment with photographic processing solutions.

EXAMPLE 2

Example 1 was repeated with the substitution of a grey dye comprising:

0.012 part 6-paratoluidino-3-methyl 1'9' anthrapiridone
0.020 part indanthrone.

The grey film produced with this dye had a colour which was unaffected by the conditions employed in the production of the polymer, its formation into a film and its treatment with photographic processing solutions.

EXAMPLE 3

Example 1 was repeated with the substitution of a grey dye comprising:

0.0165 part 1,4-bis(4-n-butyl-anilino) - 5,8 - dihydroxy anthrapiridone
0.010 part 6-paratoluidino-3-methyl 1'9' anthrapiridone.

The grey film produced with this dye had a colour which was unaffected by the conditions employed in the production of the polymer, its formation into a film and its treatment with photographic processing solutions.

I claim:

1. A polyester film which is resistant to halation and light piping effects, said film having incorporated therein a grey dye mixture which comprises from .005 to 0.15%, by weight of the polyester, of each of at least two components selected from 6-paratoluidino-3-methyl 1'9' anthrapiridone, indanthrone, tetrachloro phthalo perinone and 1,4-bis(4-n-butyl-anilino) - 5,8 - dihydroxy anthraquinone.

2. A grey dyed film according to claim 1, in which one of the dye components is indanthrone.

3. A grey dyed film according to claim 1, in which the grey dye comprises 6-paratoluidino-3-methyl 1'9' anthrapiridone and 1,4-bis(4-n-butyl-anilino)-5,8-dihydroxy anthraquinone.

4. A grey dyed film according to claim 1, in which each of the dye components is present in an amount up to 0.05% by weight.

5. A grey dyed film according to claim 1, in which the dye components are present collectively in an amount in the range 0.03 to 0.15% by weight of the organic polymeric material.

6. A film according to claim 1 wherein the film is biaxially oriented and heat set film.

7. A photographic support comprising a film according to claim 6 having a subbing layer applied thereto.

8. A photographic film comprising a support according to claim 7 having a light sensitive photographic emulsion coating on the side of the support provided with the subbing layer.

9. A polyester film according to claim 1 containing from 0.03 to 0.15% by weight of a grey dye mixture of at least two components, one of said components being indanthrone and the rest being selected from the group consisting of 6-paratoluidino-3-methyl 1'9' anthrapiridone and 1,4-bis(4-n - butyl - anilino) - 5,8 dihydroxy anthraquinone.

10. A polyester film according to claim 1 wherein the mixture comprises 6-paratoluidino-3-methyl 1'9' anthrapiridone and 1,4-bis(4-n-butyl-anilinonone)-5,8-dihydroxy anthraquinone.

References Cited

UNITED STATES PATENTS

| | | | |
|---|---|---|---|
| 3,359,230 | 12/1967 | Bowman et al. | 260—40 R |
| 3,372,138 | 3/1968 | Bowman et al. | 260—40 P |
| 3,489,713 | 1/1970 | Bowman et al. | 260—40 P |

FOREIGN PATENTS 730,692   5/1955   Great Britain.

RONALD H. SMITH, Primary Examiner

U.S. Cl. X.R.

96—87 R; 117—33.3, 138.8 F; 260—40 R